United States Patent
Cho et al.

(10) Patent No.: US 8,637,143 B2
(45) Date of Patent: Jan. 28, 2014

(54) LTCC COMPOSITION, LTCC SUBSTRATE COMPRISING THE SAME AND METHOD OF MANUFACTURING THE SAME

(75) Inventors: Beom Joon Cho, Seoul (KR); Jong Myeon Lee, Gyunggi-do (KR); Yun Hwi Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 309 days.

(21) Appl. No.: 13/004,496

(22) Filed: Jan. 11, 2011

(65) Prior Publication Data

US 2012/0028018 A1 Feb. 2, 2012

(30) Foreign Application Priority Data

Jul. 30, 2010 (KR) ........................ 10-2010-0074145

(51) Int. Cl.
*B32B 18/00* (2006.01)
(52) U.S. Cl.
USPC ............................ 428/220; 428/428; 428/325
(58) Field of Classification Search
USPC ................ 428/220, 428, 325; 264/603; 501/2
See application file for complete search history.

(56) References Cited

U.S. PATENT DOCUMENTS 5,254,191 A 10/1993 Mikeska et al.

FOREIGN PATENT DOCUMENTS

| JP | 09-71472 C | 9/1979 |
| JP | 05-270894 | 10/1993 |
| JP | 09071472 A | * 3/1997 |
| JP | 2002-111210 A | 4/2002 |

OTHER PUBLICATIONS

Machine_English_Translation_JP_09071472_A; Kudo, Yasuto; Production of Glass Ceramic Substrate; Mar. 18, 1997; JPO; whole document.*
Japanese Office Action issued in Japanese Patent Application No. 2010-282882, mailed on Nov. 27, 2012 with English translation.
Japanese Office Action, w/ English translation thereof, issued in Japanese Patent Application No. JP 2010-282882 dated Oct. 15, 2013.

* cited by examiner

*Primary Examiner* — David Sample
*Assistant Examiner* — Tahseen N Khan
(74) *Attorney, Agent, or Firm* — McDermott Will & Emery LLP

(57) ABSTRACT

There is provided a Low Temperature Co-fired Ceramic (LTCC) composition, an LTCC substrate comprising the same, and a method of manufacturing the same. The LTCC composition includes 20 to 70 parts by weight of ceramic powder; and 30 to 80 parts by weight of glass component for low-temperature sintering, wherein the ceramic powder has plate-shaped ceramic powder particles and globular ceramic powder particles, and the ceramic powder has a content ratio of the globular ceramic powder particles with respect to the plate-shaped ceramic powder particles in a range of 0 to 1.

6 Claims, 2 Drawing Sheets

LTCC COMPOSITION, LTCC SUBSTRATE COMPRISING THE SAME AND METHOD OF MANUFACTURING THE SAME

CROSS-REFERENCE TO RELATED APPLICATIONS

This application claims the priority of Korean Patent Application No. 10-2010-0074145 filed on Jul. 30, 2010, in the Korean Intellectual Property Office, the disclosure of which is incorporated herein by reference.

BACKGROUND OF THE INVENTION

1. Field of the Invention

The present invention relates to a Low Temperature Co-fired Ceramic (LTCC) composition, an LTCC substrate comprising the same, and a method of manufacturing the same, and more particularly, to an LTCC composition characterized by an excellent strength and a shrinkage-retardant effect in a planar direction, an LTCC substrate comprising the same, and a method of manufacturing the same.

2. Description of the Related Art

In general, a Low Temperature Co-fired Ceramic (LTCC) substrate using a glass-ceramic has high flexibility in terms of design because it allows the implementation of 3D-structural inter-layer circuits and the formation of cavities.

Multilayered ceramic substrates are increasingly utilized in a market of smaller and higher-functional HF components. As a multilayered ceramic substrate is structured to be complicated and precise, internal patterns and via structures have less margin in design. Thus, a non-shrinkage firing process has been required to suppress transverse shrinkage of the multilayered ceramic substrate.

To this end, flexible green sheets formed of a sinter-resistant material are bonded to one surface or both surfaces of a non-sintered ceramic substrate to suppress the shrinkage of the ceramic substrate in the x-y direction. Herein, the sinter-resistant material is not fired at a firing temperature of the material of the ceramic substrate.

However, constraint forces of the flexible green sheets bonded to the both surfaces of the ceramic substrate do not reach the center of the substrate as the ceramic substrate becomes increasingly thicker, which results in a reduction of an x-y directional shrinkage-retardant effect on the thick substrate.

A multilayered ceramic substrate made by stacking a plurality of ceramic green sheets is provided with a plurality of holes, which are used for electrical connection between inter-layer circuits and filled with a conductive electrode material. At this time, since the via electrode is formed of a conductive metal powder, an organic binder, and a solvent, the via electrode shrinks in volume during the firing process. Herein, since the conductive metal power shrinks to a greater extent than the ceramic in the firing process, the via hole and the via electrode may be separated from each other due to the different firing shrinkage rate, creating large pores in the via hole, even in a case where the via hole is completely filled with the conductive electrode material before the firing process. In particular, while being subjected to the non-shrinkage firing process, the via electrode shrinks in the circumferential direction and thus shrinks less in the thickness direction because of the green sheets which serve to inhibit shrinkage in the non-shrinkage process but have a small shrinkage retardant effect on the non-sintered ceramic laminate. As a result, after being subjected to a firing process, the via electrode is higher than the via hole, thereby protruding toward the outside, and creating pores around the via hole.

In order to prevent pores from being formed around the via hole after the firing process, the via hole is filled with an excessive amount of conductive electrode material exceeding the volume of the via hole in a green state. This causes the unfilled conductive electrode materials to flow over the via hole during the laminating and pressurizing processes, resulting in short circuits between layers of the substrate or the delamination of the layers, degrading production yield.

SUMMARY OF THE INVENTION

An aspect of the present invention provides an LTCC composition characterized by an excellent strength and a shrinkage-retardant effect in a planar direction, an LTCC substrate comprising the same, and a method of manufacturing the same.

According to an aspect of the present invention, there is provided a low temperature co-fired ceramic composition including: 20 to 70 parts by weight of ceramic powder; and 30 to 80 parts by weight of glass component for low-temperature sintering, wherein the ceramic powder has plate-shaped ceramic powder particles and globular ceramic powder particles, and the ceramic powder has a content ratio of the globular ceramic powder particles with respect to the plate-shaped ceramic powder particles in a range of 0 to 1.

Each of the plate-shaped ceramic powder particles may have a width in the range of 4 to 15 µm, and a thickness in the range of 0.2 to 1 µm.

Each of the plate-shaped ceramic powder particles may have a ratio (thickness/width) of the thickness with respect to the width in the range of 0.01 to 0.25.

Each of the globular ceramic powder particles may have an average particle size in the range of 0.5 to 5 µm.

Each of the plate-shaped ceramic powder particles or the globular ceramic powder particles may be formed of an alumina.

According to another aspect of the present invention, there is provided a low temperature co-fired ceramic substrate including: a first ceramic sheet with a degree of parallel alignment of 0.4 or higher expressed by an equation (1) below, wherein the first ceramic sheet includes: 20 to 70 parts by weight of ceramic powder having plate-shaped ceramic powder particles and globular ceramic powder particles; and 30 to 80 parts by weight of glass component for low-temperature sintering, the ceramic powder having a content ratio of the globular ceramic powder particles with respect to the plate-shaped ceramic powder particles in a range of 0 to 1, $$\text{Degree of parallel alignment} = I006/(I006+I104) \quad (1)$$

where, I006 and I104 are diffraction intensities measured from a (006) direction and a (104) direction, respectively.

The plate-shaped ceramic powder particles may have a width in the range of 4 to 15 m, and a thickness in the range of 0.2 to 1 µm.

Each of the plate-shaped ceramic powder particles may have a ratio (thickness/width) of the thickness with respect to the width in the range of 0.01 to 0.25.

The first ceramic sheet may have a thickness of 5 mm or higher.

The low temperature co-fired ceramic substrate may further include a second ceramic sheet which is stacked on one surface or the other surface of the first ceramic sheet, and has a different content ratio of the globular ceramic powder particles with respect to the plate-shaped ceramic powder particles from that of the first ceramic sheet.

The second ceramic sheet may have the same glass component for low-temperature sintering as that of the first ceramic sheet.

According to another aspect of the present invention, there is provided a method of manufacturing a low temperature co-fired ceramic substrate including: preparing slurry comprising 20 to 70 parts by weight of ceramic powder having plate-shaped ceramic powder particles and globular ceramic powder particles and 30 to 80 parts by weight of a glass component for low-temperature sintering, wherein the ceramic powder has a content ratio of the globular ceramic powder particles with respect to the plate-shaped ceramic powder particles in a range of 0 to 1, molding a ceramic green sheet so that each of the plate-shaped ceramic powder particles has a degree of parallel alignment of 0.4 or higher defined by an equation (2) below by giving a shearing stress to the slurry; and firing the ceramic green sheet by melting the glass component for low-temperature sintering, $$\text{Degree of parallel alignment} = I006/(I006 + I104) \qquad (2)$$

where, I006 and I104 are diffraction intensities measured from a (006) direction and a (104) direction, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
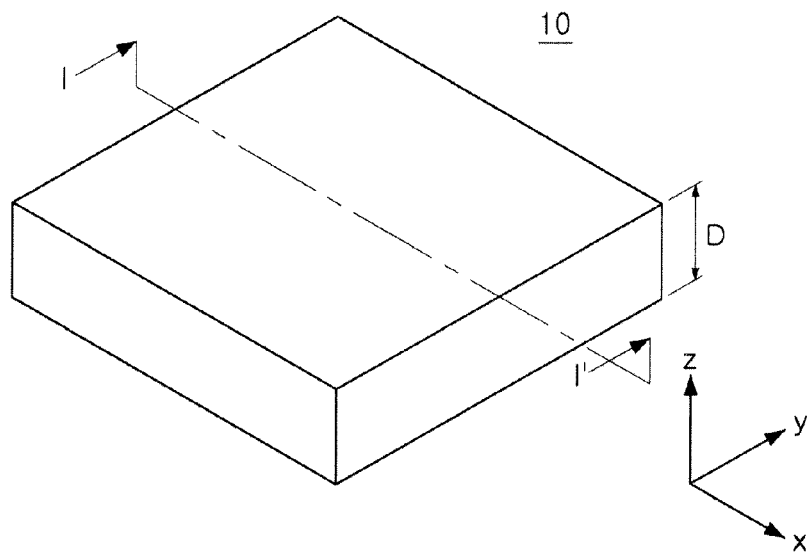
FIG. 1A is a schematic perspective view illustrating a Low Temperature Co-fired Ceramic (LTCC) substrate according to an exemplary embodiment of the present invention.

Exemplary embodiments of the present invention will now be described in detail with reference to the accompanying drawings. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 1B:
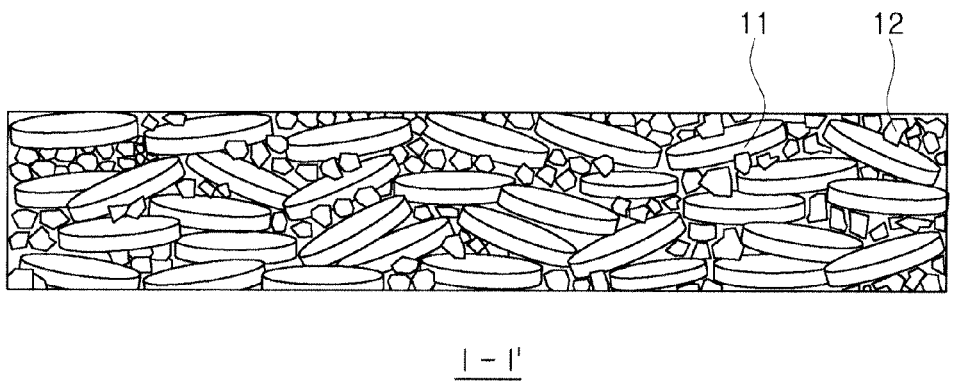
FIG. 1B is a schematic cross-sectional view illustrating the LTCC substrate taken along line I-I' of FIG. 1A.

FIG. 1A is a schematic perspective view illustrating a Low Temperature Co-fired Ceramic (LTCC) substrate according to an exemplary embodiment of the present invention. FIG. 1B is a schematic cross-sectional view illustrating the LTCC substrate taken along line of I-I' of FIG. 1A.

Referring to FIGS. 1A and 1B, the LTCC substrate is formed with a first ceramic layer 10, which includes plate-shaped ceramic powder particles 11, globular ceramic powder particles 12, and a glass component for low-temperature sintering.

The LTCC ceramic substrate is sintered by melting the glass component for low-temperature sintering, and the ceramic powder thereof does not undergo dissolution, but remain as plate-shaped ceramic powder particles and as globular ceramic powder particles, respectively.

Also, the plate-shaped ceramic powder particles each have a degree of parallel alignment of 0.4 or higher expressed by equation (1) below, and the LTCC substrate is prevented from being shrunk in a planar direction (x-y direction) by anisotropic shrinkage of the plate-shaped ceramic powder particles 11 which are aligned in parallel with one another. Also, the LTCC substrate has excellent rigidity through a proper mixture of the plate-shaped ceramic powder particles 11 with the globular ceramic powder particles 12.

$$\text{Degree of parallel alignment} = I_{006}/(I_{006} + I_{104}) \qquad (1)$$

In equation (1), $I_{006}$ and $I_{104}$ denote diffraction intensities measured from a (006) direction and a (104) direction, respectively.

The LTCC substrate includes the LTCC composition according to the exemplary embodiment of the present invention. Hereinafter, a detailed description will be given of the LTCC composition according to the exemplary embodiment of the present invention.

The LTCC composition includes 20 to 70 parts by weight of ceramic powder, and 30 to 80 parts by weight of glass component for low-temperature sintering. Herein, the densification of the ceramic powders is achieved by the glass component for low-temperature sintering.

The ceramic powder includes the plate-shaped ceramic powder particles 11 and the globular ceramic powder particles 12.

Figure 2:
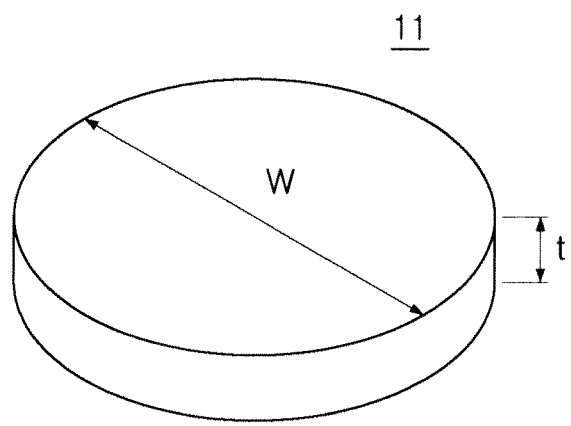
FIG. 2 is a schematic perspective view illustrating a plate-shaped ceramic powder particles particle according to the exemplary embodiment of the present invention.

FIG. 2 is a schematic perspective view illustrating one of the plate-shaped ceramic powder particles 11 according to the exemplary embodiment of the present invention.

The plate-shaped ceramic powder particles 11 may be made of materials which are generally used in manufacturing an LTCC, and may be an alumina which has a high reactivity with the glass component for low-temperature sintering of the LTCC material and is easy to be formed to be shaped like a plate.

Each of the plate-shaped ceramic powder particles 11 may have a width (w), a transversal size, ranging from 4 to 15 μm and a thickness (t), a longitudinal size, ranging from 0.2 to 1 μm. The width (w) of the plate-shaped ceramic powder particles is in the range of 8 to 15 μm, and the thickness (t) of the plate-shaped ceramic powder particles is in the range of 0.2 to 0.4 μm.

A ratio (t/w) of the thickness with respect to the width of the plate-shaped ceramic powder particles may be in the range of 0.01 to 0.25 μm. A ratio (t/w) of the thickness with respect to the width of the plate-shaped ceramic powder particles may be in the range of 0.01 to 0.05.

The plate-shaped ceramic powder particles 11 are parallel-aligned in the green sheets having the LTCC composition, and thus play a role of suppressing the shrinkage of the green sheets in the planar direction (x-y direction), in comparison to the shrinkage of the green sheets in the thickness direction (z direction).

When the plate-shaped ceramic powder particles are very narrow in width or very thick in thickness, the parallel-alignment of the plate-shaped ceramic powder particles may not be sufficiently realized in the green sheet. Therefore, the shrinkage of the planar direction (x-y direction) may not be suppressed by the anisotropic shrinkage of the plate-shaped ceramic powder particles during the firing. When the plate-shaped ceramic powder particles are very thin in thickness or very wide in width, there may be a concern that the plate-shaped ceramic powder particles may be broken during the mixing-grinding process for preparing slurry.

The globular ceramic powder particles 12 may be materials which are generally used in manufacturing an LTCC, and may be an alumina which has a high reactivity with the glass component for low-temperature sintering.

The globular ceramic powder particles 12 may improve the rigidity of a substrate by increasing the density of the LTCC substrate.

An average particle size of the globular ceramic powder particles 12 may be in the range of 0.5 to 5 µm.

A mixing ratio of the plate-shaped ceramic powder particles 11 with respect to the globular ceramic powder particles 13 may be adjusted according to the purposes of the LTCC composition. The present invention is not limited thereto, and the content ratio of the globular ceramic powder particles with respect to the plate-shaped ceramic powder particles (globular ceramic powder particles/plate-shaped ceramic powder particles) may be in the range of 0 to 1.

When the ceramic substrate increases in size, a content of the globular ceramic powder particles may be restricted so as to effectively implement a non-shrinkage firing of the planar direction and to ensure the moisture resistance and electrical characteristics thereof, and the content ratio of the globular ceramic powder particles with respect to the plate-shaped ceramic powder particles may be in the range of 0 to 0.5.

In the LTCC substrate according to the exemplary embodiment of the present invention, the planar-directional shrinkage rate and the rigidity of the substrate may be adjusted by adjusting the mixing ratio of the plate-shaped ceramic powder particles 11 and the globular ceramic powder particles 12. The planar-directional shrinkage rate (x-y direction) is increased according to an increase in the content of the globular ceramic powder particles 12, which results in an increase of the rigidity and firing density of the LTCC substrate.

The LTCC composition is fired by melting the glass component for low-temperature sintering without dissolution of the plate-shaped ceramic powder particles and the globular ceramic powder particles. The glass component for low-temperature sintering is not especially limited. As for the glass component for LTCC material, a glass component widely used in the LTCC may be used.

The present invention is not limited thereto, and as for the glass component, borosillicate glass with good flowability at a high temperate ($SiO_2$-$B_2O_3$-$R_2O$, where R is an alkali metal, such as Li, Na, and K) may be exemplified.

The content of the glass component for low-temperature sintering may be in the range of 30 to 80 parts by weight. When the content is less than 30 parts by weight, firing may not be sufficiently performed at a low temperature. When the content of the glass component is higher than 80 parts by weight, a shrinkage-retardant effect may be reduced, and the rigidity of the substrate may be reduced as well.

In the related art, in order to suppress the shrinkage of the LTCC substrate in a planar direction, constraint layers are fired after being respectively stacked on an upper surface or a lower surface of the green sheet or being pressurized. However, as the ceramic substrate becomes thicker, the constraint forces resulting from external constraint layers fail to reach the center of the ceramic substrate. As a result, there was a problem that non-shrinkage firing is not implemented as it is performed toward the center of the thick substrate.

On the other hand, according to the exemplary embodiment of the present invention, components of the LTCC composition itself prevent the substrate from being shrunk in the planar direction, so that a large-sized LTCC substrate and a thicker ceramic substrate may be manufactured.

The present invention is not limited thereto, and the LTCC substrate according to the exemplary embodiment of the present invention may have a thickness of 5 mm or above.

Also, components of the LTCC composition may be uniformly aligned in the green sheets, and thus the rigidity of the substrate may be prevented from being degraded due to non-uniform sintering.

The LTCC substrate includes the LTCC composition, and may be manufactured by the following methods.

The LTCC composition is mixed with a binding agent, a solvent, a dispersant, and the like to thereby prepare slurry for the formation of the green sheets.

The slurry may be molded to have a sheet shape, through a blade, on a molded film, such as a PET film. For molding of the slurry into the sheet shape, when the slurry is subjected to a blade, shearing stress generated between the blade and the PET film aligns the plate-shaped ceramic powder particles in the slurry to be in parallel with one another, and then allows the globular ceramic powder particles and the glass component for low-temperature sintering to be positioned between the parallel-aligned plate-shaped ceramic powder particles.

The plate-shaped ceramic powder particles may be formed to have a degree of the parallel alignment of 0.4 or higher expressed by equation (2).

$$\text{Degree of parallel alignment} = I_{006}/(I_{006}+I_{104}) \tag{2}$$

In equation (2), the degree of parallel alignment for the plate-shaped ceramic powder particles is a ratio of diffraction intensities of $I_{006}$ and $I_{104}$ measured from a (006) direction and a (104) direction, respectively.

The degree of the parallel alignment of the plate-shaped powders may be a ratio between the diffraction intensities of the (006) and (104) directions measured by a Cu—Kα X ray diffraction.

A molding condition needs to be adjusted, in order to increase the degree of the parallel alignment in the green sheets of the plate-shaped ceramic powder particles of the LTCC composition.

For example, in the case of the ceramic green sheets with the molding thickness of 50 µm or higher, the composition and the viscosity of the slurry need to be adjusted so that the molding speed is more than 5 m per minute. The higher the degree of the parallel alignment of the plate-shaped ceramic powder particles, the more effectively the shrinkage in the x-y direction is suppressed.

Via holes and electrode patterns are subjected to a binder-removing process and a firing process after being printed on the green sheets, thereby manufacturing a ceramic substrate. Herein, the firing process may be performed at a melting temperature of the glass component for low-temperature sintering, without dissolution of the ceramic powders. The firing temperature may be appropriately adjusted depending on the glass component for low-temperature sintering, and the firing process may be performed at a low temperature of 900☐ or below.

During the firing process, the ceramic powders are in contact with one another as the glass components flows, and thus the movement between the ceramic powders suppresses shrinkage in the planar direction. At this time, the parallel-alignment of the plate-shaped ceramic powder particles restricts the horizontal movement of the plate-shaped ceramic powder particles, which results in a suppression of the horizontal shrinkage rate.

Figure 3:
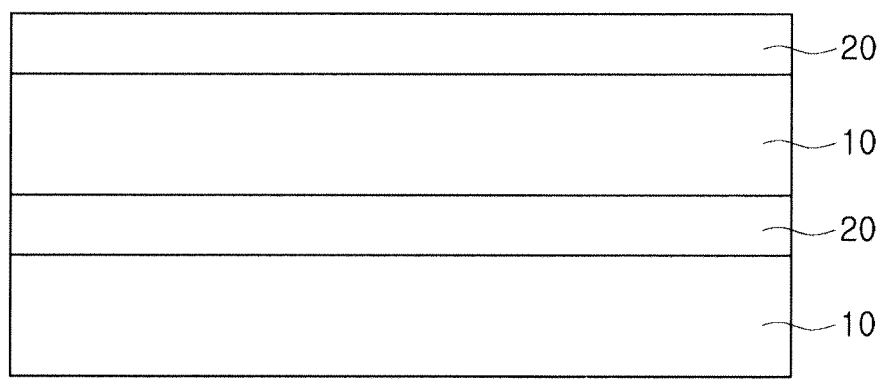
FIG. 3 is a schematic cross-sectional view illustrating an LTCC substrate according to another exemplary embodiment of the present invention.

FIG. 3 is a schematic cross-sectional view illustrating an LTCC substrate according to another exemplary embodiment of the present invention.

It could be seen that the LTCC substrate according to the exemplary embodiment of the present invention has a structure made by stacking the first ceramic sheets 10 shown in FIG. 1A, and the second ceramic sheets 20 respectively formed on one surface and the other surface of one of the first ceramic sheets 10.

The first ceramic sheet 10 is as described above, and each of the second ceramic sheets 20 may be LTCC sheets with a content ratio (globular ceramic powder particles with respect to the plate-shaped ceramic powder particles) different from that of the first ceramic sheets 10.

At this time, the glass component for low-temperature sintering contained in the second ceramic sheets 20 may be formed of the same component as that of the glass for low-temperature sintering of the first ceramic sheets. Thus, an erroneous reaction may be prevented in a bonded interface between the first ceramic sheets 10 and the second ceramic sheets 20, and the physical and chemical characteristics may be prevented from being degraded due to the bonding between the dissimilar sheets.

Hereinafter, the present invention will be described in more detail through the comparison between exemplary examples and comparative examples. However, the present invention is not limited thereto, and these examples are merely for helping in a detailed understanding of the present invention.

As listed in Table 1 below, the contents of plate-shaped fillers, granular fillers, and glass component was adjusted, so as to prepare the LTCC composition. Also, the degrees of the parallel alignment of the plate-shaped powders in the green sheets were varied through the adjustment of the molding condition of the slurry for the ceramic composition. As a result, LTCC substrates were manufactured to have a size of 100 mm×100 mm×1.0 mm, and a size of 100 mm×100 mm×5 mm, respectively, and then firing characteristics thereof were measured. At this time, via holes, used for measuring the shrinkage rate and for observing the shape thereof, were provided in the ceramic multilayered substrate.

substrate with a thickness of 5 mm was subjected to a non-shrinkage firing process, the x-y shrinkage rate was merely 1.34, and thus it was impossible to implement non-shrinkage.

In the exemplary examples 1 and 2, and the comparative example 1, the mixing ratio of the plate-shaped powders and globular powders as fillers was varied under the condition in which the content of glass component for low-temperature sintering remains unchanged. It could been seen that the degree of the parallel alignment of the plate-shaped powder was decreased according to an increase in the content of globular powders, and as a result, the x-y shrinkage rate of the 1 mm-substrate was increased as well, and thus the shrinkage anisotropy ratio was reduced. As the shrinkage anisotropy ratio was decreased, the x-y shrinkage rate was increased during the non-shrinkage firing of the substrate with a thickness of 5 mm. In the comparative example 1, the degree of parallel alignment of the plate-shaped ceramic powder particles was 0.3, and the x-y shrinkage rate of the non-shrinkage substrate was 0.65. Therefore, the x-y shrinkage rate of 0.65 exceeded a maximum allowable shrinkage rate of the non-shrinkage firing, and thus the via hole had a poor shape.

According to a comparison between exemplary example 3 and the comparative example 1, the slurry composition and molding condition were adjusted so that the degrees of parallel alignment for the plate-shaped powders alone was increased from 0.3 to 0.41, under the condition in which the ceramic powders had the same content ratio as the examples 1 and 3. Thereafter, it was understood from the exemplary example 3 and comparative example 1 that it was possible to reduce the x-y shrinkage rate of 1 mm-substrate, and reduce the x-y shrinkage rate of 5 mm-substrate to 0.37 during the non-shrinkage firing, which results in a non-shrinkage of the substrate.

According to the exemplary embodiment of the present invention, the LTCC composition is prevented from being shrunk in a planar direction (x-y direction) by an anisotropic

TABLE 1

|  | Exemplary example 1 | Exemplary example 2 | Exemplary example 3 | Comparative example 1 | Comparative example 2 |
|---|---|---|---|---|---|
| Content of plate-shaped powder particles [wt %] | 40 | 30 | 20 | 20 | 0 |
| Content of globular powders [wt %] | 0 | 10 | 20 | 20 | 40 |
| Content of glass component particles [wt %] | 60 | 60 | 60 | 60 | 60 |
| Degree of parallel alignment of plate-shaped powder particles | 0.59 | 0.45 | 0.41 | 0.3 | 0.09 |
| x-y shrinkage rate in 1 mm-substrate | 4.65 | 6.5 | 7.1 | 8.65 | 13.2 |
| Z shrinkage in 1 mm-substrate | 39.01 | 36.7 | 35.7 | 33.5 | 26.5 |
| Ratio of shrinkage anisotropy | 8.4 | 5.6 | 5.0 | 3.9 | 2.0 |
| x-y shrinkage rate for 5 mm non-shrinkage substrate | 0.16 | 0.31 | 0.37 | 0.65 | 1.34 |
| Shape of via hole | Good | Good | Good | Poor | Poor |

In the comparative example 2 of table (1), globular ceramic powder particles alone were used as the fillers of the LTCC composition. At this time, the firing shrinkage anisotropy ratio, calculated by dividing a z-directional shrinkage rate by an x-y directional shrinkage rate (z-directional shrinkage rate/x-y directional shrinkage rate), was merely 2.0. When a shrinkage of the plate-shaped ceramic powder particles which are aligned to be parallel with one another.

While the present invention has been shown and described in connection with the exemplary embodiments, it will be apparent to those skilled in the art that modifications and variations can be made without departing from the spirit and scope of the invention as defined by the appended claims.

What is claimed is:

1. A low temperature co-fired ceramic substrate comprising a first ceramic sheet with a degree of parallel alignment of 0.4 or higher expressed by an equation below,
wherein the first ceramic sheet comprises:
20 to 70 parts by weight of ceramic powder having plate-shaped ceramic powder particles and globular ceramic powder particles; and
30 to 80 parts by weight of glass component for low-temperature sintering, the ceramic powder having a content ratio of the globular ceramic powder particles with respect to the plate-shaped ceramic powder particles in a range of 0 to 1, $$\text{Degree of parallel alignment} = I_{006}/(I_{006}+I_{104}), \quad \text{(equation)}$$

where, $I_{006}$ and $I_{104}$ are diffraction intensities measured from a (006) direction and a (104) direction, respectively.

2. The low temperature co-fired ceramic substrate of claim 1, wherein each of the plate-shaped ceramic powder particles has a width in the range of 4 μm to 15 μm, and a thickness in the range of 0.2 μm to 1 μm.

3. The low temperature co-fired ceramic substrate of claim 1, wherein each of the plate-shaped ceramic powder particles has a ratio (thickness/width) of a thickness thereof with respect to a width thereof in a range of 0.01 to 0.25.

4. The low temperature co-fired ceramic substrate of claim 1, wherein the first ceramic sheet has a thickness of 5 mm or higher.

5. The low temperature co-fired ceramic substrate of claim 1, further comprising a second ceramic sheet which is stacked on one surface or the other surface of the first ceramic sheet, and has a different content ratio of the globular ceramic powder particles with respect to the plate-shaped ceramic powder particles from that of the first ceramic sheet.

6. The low temperature co-fired ceramic substrate of claim 5, wherein the second ceramic sheet includes the same glass component for low-temperature sintering as that of the first ceramic sheet.

* * * * *